(12) United States Patent
Sasaki

(10) Patent No.: US 7,672,755 B2
(45) Date of Patent: Mar. 2, 2010

(54) LIBRARY DEVICE

(75) Inventor: Shinobu Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1667 days.

(21) Appl. No.: 10/779,820

(22) Filed: Feb. 18, 2004

(65) Prior Publication Data

US 2005/0065648 A1 Mar. 24, 2005

(30) Foreign Application Priority Data

Sep. 18, 2003 (JP) .............................. 2003-326472

(51) Int. Cl.
*G06F 19/00* (2006.01)
*G06F 7/00* (2006.01)
*G11B 15/18* (2006.01)

(52) U.S. Cl. ...................... 700/245; 700/218; 700/214; 414/1; 414/10; 414/11; 414/277; 360/69; 360/71; 360/92; 360/132

(58) Field of Classification Search ................. 700/218, 700/214, 245; 414/277, 1, 10, 11; 360/69, 360/71, 92, 132; 211/1.57; 720/600; 711/4, 711/111

See application file for complete search history.

(56) References Cited

U.S. PATENT DOCUMENTS

| | | | | | |
|---|---|---|---|---|---|
| 4,864,511 | A | * | 9/1989 | Moy et al. ................... | 700/218 |
| 5,287,459 | A | * | 2/1994 | Gniewek ..................... | 711/111 |
| 5,495,371 | A | * | 2/1996 | Munemoto et al. ............. | 360/71 |
| 5,644,445 | A | * | 7/1997 | Ishikawa ..................... | 360/71 |
| 5,883,864 | A | * | 3/1999 | Saliba ......................... | 360/92 |
| 5,967,339 | A | * | 10/1999 | Utsumi et al. ............. | 211/41.12 |
| 6,144,519 | A | * | 11/2000 | Hanaoka et al. ................ | 360/92 |
| 6,161,058 | A | * | 12/2000 | Nishijo et al. ................ | 700/218 |
| 6,230,075 | B1 | * | 5/2001 | Nishijo et al. ................ | 700/214 |
| 6,449,223 | B1 | * | 9/2002 | Kanetsuku et al. ........ | 369/30.41 |

(Continued)

FOREIGN PATENT DOCUMENTS

JP 6-168076 6/1994

(Continued)

OTHER PUBLICATIONS

NPL—DLTsage Back Up Information; Diagnostic application cartridge in Library Device.*

(Continued)

*Primary Examiner*—Khoi Tran
*Assistant Examiner*—Ian Jen
(74) *Attorney, Agent, or Firm*—Staas & Halsey LLP (57) ABSTRACT

There is provided a library device which can be restored to working order quickly and reliably even when a control board containing information necessary for the operation of the library device is replaced. The library device includes a cell array which consists of an array of multiple cells each of which contains one cartridge containing a magnetic tape, magnetic tape drives in which the cartridges are removably mounted and which access the storage medium contained in the cartridges, a robot which transfers the cartridges between the cell array and the magnetic tape drives, a main control board which controls the operation of the entire library device, a barcode label which represents ID information for identification of the library device, and cell flags which are marks used to recognize the locations of the cells composing the cell array.

9 Claims, 8 Drawing Sheets

U.S. PATENT DOCUMENTS

| | | | |
|---|---|---|---|
| 6,943,976 B2 * | 9/2005 | Goodman et al. | 360/69 |
| 7,039,924 B2 * | 5/2006 | Goodman et al. | 720/600 |
| 7,123,444 B1 * | 10/2006 | Solhjell | 360/132 |
| 7,181,313 B2 * | 2/2007 | Studebaker et al. | 700/214 |
| 7,206,156 B2 * | 4/2007 | Ballard | 360/69 |

FOREIGN PATENT DOCUMENTS

| | | |
|---|---|---|
| JP | 07-141124 | 6/1995 |
| JP | 7-141124 | 6/1995 |
| JP | 9-147535 | 6/1997 |
| JP | 2002-117644 | 4/2002 |
| JP | 2002-133751 | 5/2002 |

OTHER PUBLICATIONS

NPL—DLTsage diagnostic cartridge.*

Japanese Office Action Mailed Dec. 11, 2007, in Japanese Application 2003-326472.

* cited by examiner

LIBRARY DEVICE

BACKGROUND OF THE INVENTION

1. Field of the Invention

The present invention relates to a library device which mounts, stores, and retrieves multiple cartridges each containing a storage medium as well as accesses the storage medium.

2. Description of the Related Art

Conventionally, library devices are known which mount, store, and retrieve multiple cartridges each containing a storage medium such as a magnetic tape or optical disk as well as access the storage medium (e.g., Patent Documents 1, 2, and 3 as listed below).

These library devices have a cell array consisting of an array of multiple cells which contain multiple cartridges each containing a storage medium; media drives in which the cartridges are removably mounted and which accesses the storage medium contained in the cartridges; and a robot which transfers the cartridges between the cell array and the media drives.

With this type of library device, to transfer the cartridges between the cell array and the media drives reliably, the robot must be positioned accurately according to the location of a desired cell. For that, the location of the cell array is measured with high accuracy and the robot is positioned according to the resulting location information.

It takes considerable amounts of time and effort to obtain the location information, and thus the location information obtained must be stored safely.

For example, a magnetic-tape library device disclosed in Patent Document 1 stores control information including location information about individual magnetic tape cartridges in two separate non-volatile memories on a control board. This makes it possible, even if one of the non-volatile memories should be crashed or information in one of the non-volatile memories should be lost for some reason, to restore the magnetic-tape library device to working order using the information stored in the other non-volatile memory.

However, in the case of the magnetic-tape library device disclosed in Patent Document 1, when the existing control board is removed from the library device and a new one is mounted, such as when it becomes necessary to replace the control board for maintenance or the like, location information must be prepared anew by measuring the locations of all the cartridges. Thus, long hours of work and great cost are required to restore the library device to working order.

There are library devices which employ another method according to which important information such as location information about cartridges is backed up in a secondary storage medium such as a flexible disk and when the control board is changed, the operator manually restores the system using the information backed up in the storage medium. However, this method may cause trouble due to operating errors. Besides, it requires increased maintenance time.

[Patent Document 1]
  Japanese Patent Laid-Open No. 06-168076 (pp. 1-2; FIGS. 6-8)

[Patent Document 2]
  Japanese Patent Laid-Open No. 2002-117644 (pp. 1-2; FIGS. 1-3)

[Patent Document 3]
  Japanese Patent Laid-Open No. 07-141124 (pp. 1-3; FIGS. 1-2)

SUMMARY OF THE INVENTION

In view of the above circumstances, the present invention has an object to provide a library device which can be restored to working order quickly and reliably even when a control board containing information necessary for the operation of the library device is replaced.

To achieve the above object, the present invention provides a library device including:

a cell array which consists of an array of multiple cells each of which contains one of multiple cartridges each containing a storage medium;

media drives in which the cartridges are removably mounted and which access the storage medium contained in the cartridges;

a robot which transfers the cartridges between the cell array and the media drives; and a control board which controls operation of the library device, being equipped with a first memory which stores control information needed to control the operation of the library device, rewritably in a non-volatile manner, wherein each of the cartridges contains the storage medium and comprises a second memory which stores information rewritably in a non-volatile manner, the robot is equipped with a memory reader/writer which accesses the second memory installed in the cartridge received by the robot, and one of the multiple cartridges is a diagnostic cartridge for the library device and the second memory installed in the diagnostic cartridge stores backup information which is the same as the control information stored in the first memory.

Normally, the cartridge is equipped with not only the storage medium such as magnetic tape, but also a memory which corresponds to the second memory to store management information about the storage medium (e.g., if the cartridge contains magnetic tape, the management information includes the number of writes into the magnetic tape or the number of allowed retries in case the magnetic tape cannot be accessed in one try). Also, the library device according to the present invention is equipped with not only the cartridges used by the user of the library device, but also the diagnostic cartridge used for diagnosis and maintenance by the manufacturer of the library device. The diagnostic cartridge is of the same type as the cartridges used by the user, and thus it is equipped with not only a storage medium, but also a memory for management of the storage medium.

The present invention has been made in view of the above. Specifically, according to the library device of the present invention, the first memory needed for the operation of the library device is installed on the control board, the second memory installed in the diagnostic cartridge stores backup information which is the same as the control information stored in the first memory, and the robot is equipped with a memory reader/writer which accesses the second memory. Consequently, even when the control board is replaced, all that is necessary is for the robot to read the backup information out of the second memory installed in the diagnostic cartridge and send it to the control board in order for the backup information to be written into the first memory, and the library device can be restored to working order quickly and reliably.

Also, the library device readily restorable to working order can be implemented without additional cost.

Preferably, the first memory stores, as part of the control information, ID information which represents the library device; and upon power-up, the control board judges whether the ID information stored in the first memory represents this library device, and if the ID information stored in the first memory does not represent this library device, the robot takes the diagnostic cartridge out of the cell array, reads the backup information out of the second memory installed in the diagnostic cartridge, and sends the backup information to the control board, and the control board writes the backup information received from the robot into the first memory.

When configured as described above, the library device of the present invention can automatically judge upon power-up whether the control board has been replaced, and if it is found that the control board has been replaced, the library device can automatically restore the control information from the backup information stored in the second memory of the diagnostic cartridge.

Also, preferably, the library device has a serial label which contains ID information representing this library device and the robot has a first sensor which reads the serial label; and upon power-up, the robot reads the serial label using the first sensor, extracts the ID information from the serial label, and sends the ID information to the control board, and the control board checks the ID information received from the robot against the ID information stored in the first memory, and thereby judges whether the ID information stored in the first memory represents this library device.

When configured as described above, the library device of the present invention can judge easily and reliably whether the control board has been replaced.

Incidentally, the ID information which represents the library device may be stored in a memory installed on the robot rather than in the serial label described above.

Also, preferably, the cell array has, over a plurality of locations, cell flags which are marks used to recognize locations of the plurality of cells composing the cell array, the robot has a second sensor to detect the locations of the cell flags, and the first memory stores, as part of the control information, location information about the cell flags detected by the second sensor or location information about the cells corresponding to the cell flags detected by the second sensor; and upon power-up, if the two pieces of ID information do not match, the robot detects the locations of the cell flags using the second sensor and sends the location information about the cell flags to the control board, the control board finds location information about the cell containing the diagnostic cartridge based on the location information received from the robot, and the robot takes the diagnostic cartridge out of the cell containing the diagnostic cartridge by moving according to the location information, found by the control board, about the cell containing the diagnostic cartridge.

To read the backup information out of the second memory installed in the diagnostic cartridge, the robot needs to possess the location information about the cell containing the diagnostic cartridge. The location information is originally stored in the first memory on the control board, but when the control board is replaced, the first memory on the new control board does not provide accurate location information. When location information about the diagnostic cartridge is acquired by detecting the location of the cell flag as described above, conventional tolerances can be applied to the mounting location and the like of the cell array. This makes it unnecessary to take measures for reducing errors in the mounting location and the like in order to implement the present invention The location information about the diagnostic cartridge may be obtained directly by an optical position detector mounted on the robot instead of obtaining the location information about the cell containing the diagnostic cartridge using the cell flags and second sensor as described above.

Also, the cartridges may contain magnetic tape as the storage medium and the media drives may access the magnetic tape contained in the cartridges.

When configured as described above, the library device of the present invention can be applied to magnetic-tape library devices in general use.

In addition to the magnetic tape, the library device of the present invention can be suitably applied to cartridges which contain magneto-optical disks or optical disks.

It is also preferable that the second memory installed in the cartridge and the memory reader/writer installed on the robot communicate with each other wirelessly.

When configured as described above, the library device of the present invention can conduct communications from the cartridges to the robot on a non-contact basis, and thus can improve the reliability of the cartridges.

It is also preferable that the serial label is a barcode label which uses a barcode as the ID information about the library device and that the first sensor reads the barcode recorded on the barcode label using a one-dimensional array of light-sensitive devices.

When configured as described above, the library device of the present invention can check the ID information using a barcode system in general use, making the operation of the library device more stable.

Furthermore, it is also preferable that the first sensor combines the second sensor.

By configuring the library device of the present invention as described above, it is possible to reduce its cost.

As described above, the present invention can implement a library device which can be restored to working order quickly and reliably even when a control board containing information necessary for the operation of the library device is replaced.

DETAILED DESCRIPTION OF THE PREFERRED EMBODIMENTS

An embodiment of the present invention will be described below with reference to the drawings.

Figure 1:
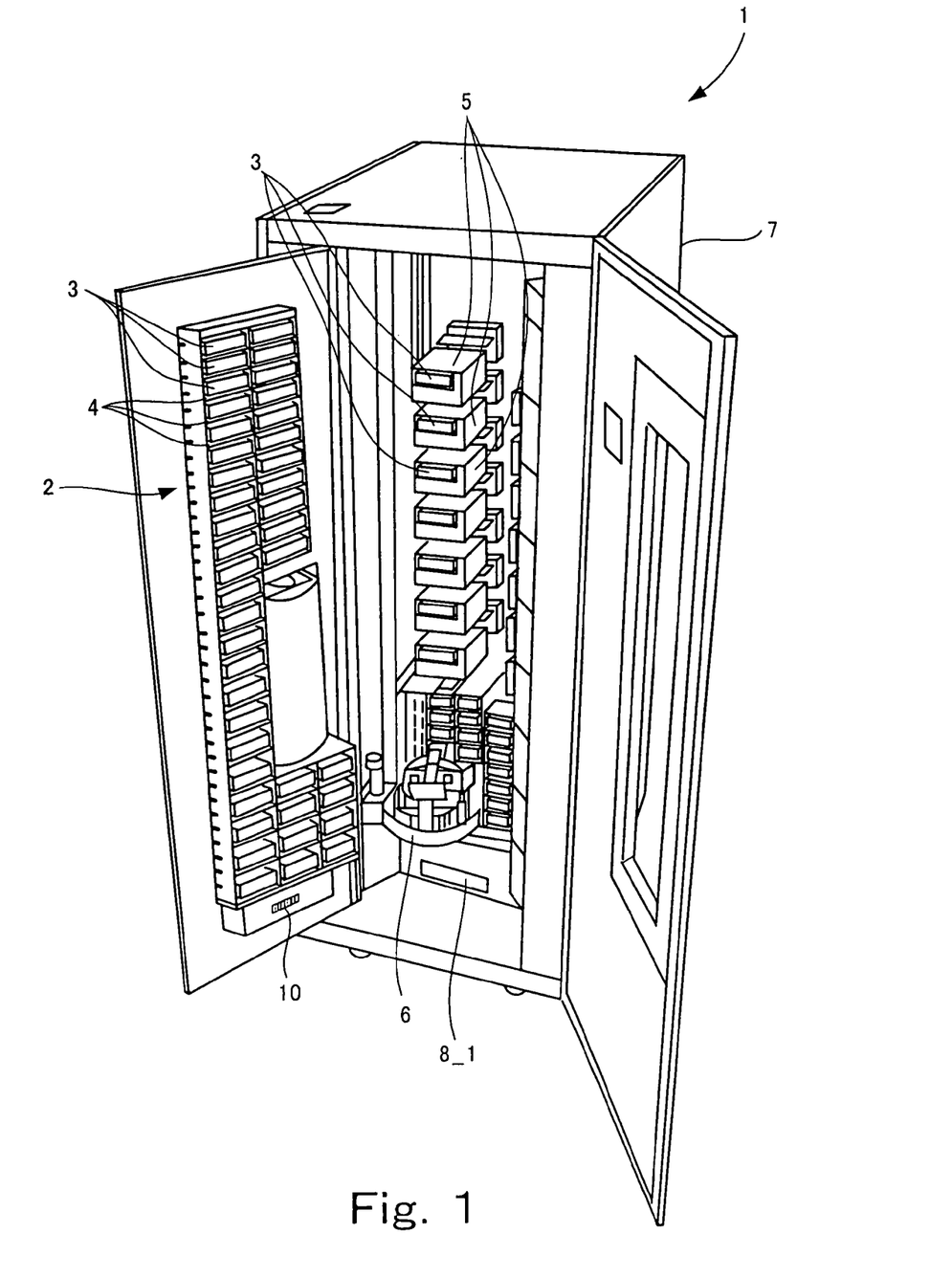
FIG. 1 is an external view of a library device according to one embodiment of the present invention.

FIG. 1 is an external view of a library device according to one embodiment of the present invention.

As shown in FIG. 1, the library device 1 contains, in its enclosure 7, a cell array 2 which consists of an array of multiple cells 4 each of which contains one cartridge 3 containing a magnetic tape (not shown), magnetic tape drives 5 in which the cartridges 3 are removably mounted and which access the storage medium contained in the cartridges 3, a robot 6 which transfers the cartridges 3 between the cell array 2 and the magnetic tape drives 5, a main control board 8_1 which controls the operation of the entire library device, a barcode label 10 which is provided below the cell array 2 and represents ID information for identification of the library device, etc.

Incidentally, the magnetic tape in this embodiment corresponds to the storage medium according to the present invention, the magnetic tape drive 5 in this embodiment corresponds to the media drive according to the present invention, the barcode label 10 in this embodiment corresponds to the serial label according to the present invention, and the main control board 8_1 in this embodiment corresponds to the control board according to the present invention.

Figure 2:
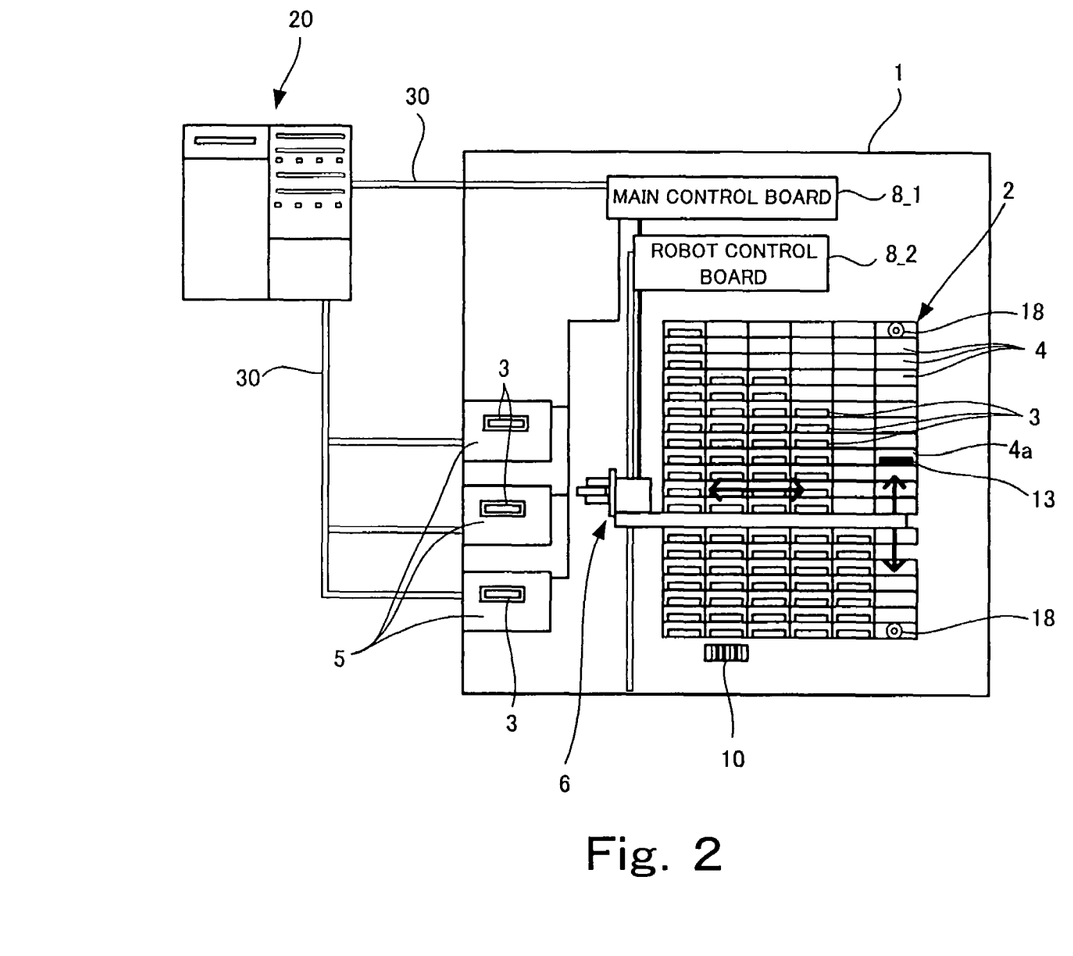
FIG. 2 is a schematic block diagram of the library device according to the embodiment of the present invention.

FIG. 2 is a schematic block diagram of the library device according to the embodiment of the present invention.

In addition to the cell array 2, the cartridges 3, the cells 4, the magnetic tape drives 5, the robot 6, etc. described above, FIG. 2 shows components such as the main control board 8_1, a robot control board 8_2, cell flags 18 which are marks used to recognize the locations of the cells 4 composing the cell array 2, and a host computer 20 which externally controls the library device 1.

The host computer 20 is connected with the main control board 8_1 and magnetic tape drives 5 of the library device 1 via a cable 30.

One of the cartridges 3 used for the library device 1 is a diagnostic cartridge 13 for the library device 1 and is normally contained in a predetermined cell 4a in the cell array 2.

Figure 3:
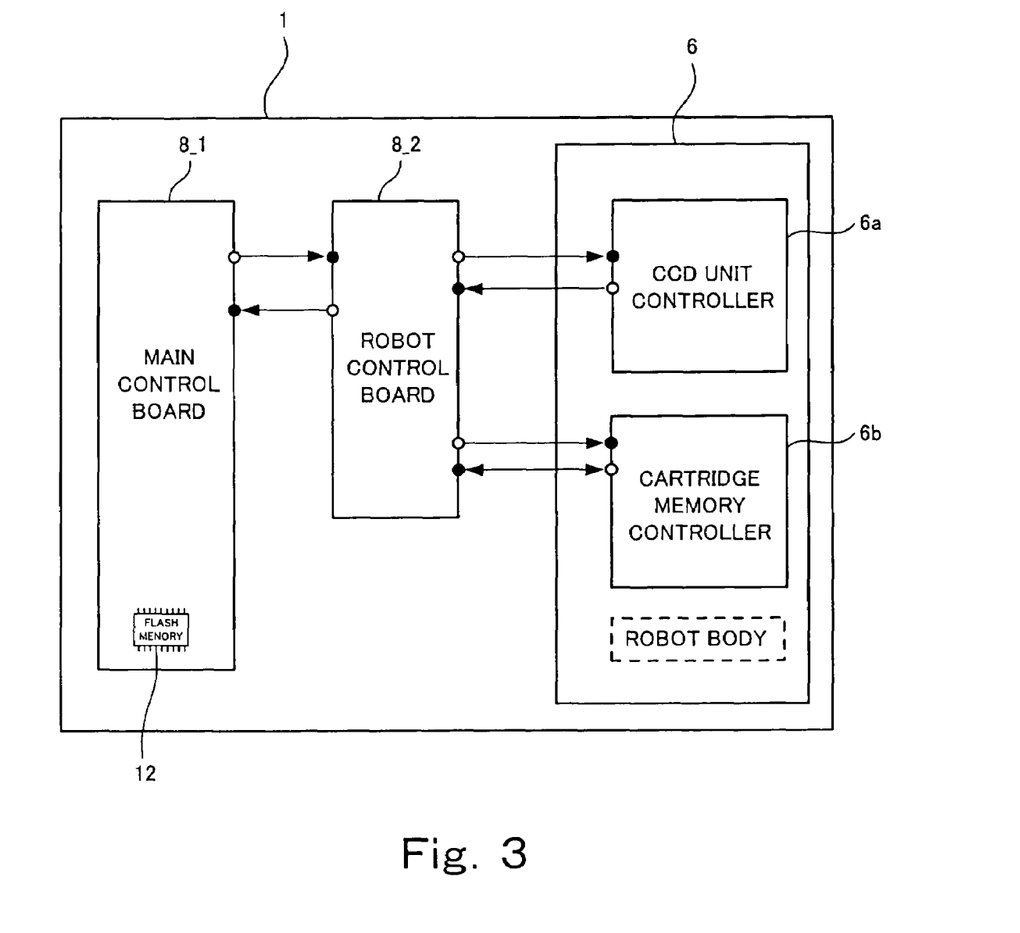
FIG. 3 is a diagram showing a circuit configuration of the library device according to this embodiment.

FIG. 3 is a diagram showing a circuit configuration of the library device according to this embodiment.

As shown in FIG. 3, the library device 1 has the robot control board 8_2 which controls the robot 6 and the main control board 8_1 which controls the operation of the entire library device 1 including the robot control board 8_2 and tape drives 5.

Besides, the main control board 8_1 is equipped with a flash memory 12 which stores control information needed to control the operation of the library device 1, rewritably in a non-volatile manner.

Incidentally, the flash memory 12 in this embodiment corresponds to the first memory according to the present invention. Alternatively, for example, a battery-backed-up SRAM may be used as the first memory.

The control information stored in the flash memory 12 includes, for example, ID information and initialization information about the library device 1 and other information needed to control the operation of the library device 1.

The robot 6 is equipped with a CCD unit controller 6a which controls a CCD unit (see FIG. 5) and a cartridge memory controller 6b which controls cartridge memories (described later) mounted in individual cartridges as well as with a robot body which consists of mechanical parts of the robot.

The robot control board 8_2 is connected with the main control board 8_1, CCD unit controller 6a, and cartridge memory controller 6b by electrical wiring.

Figure 4:
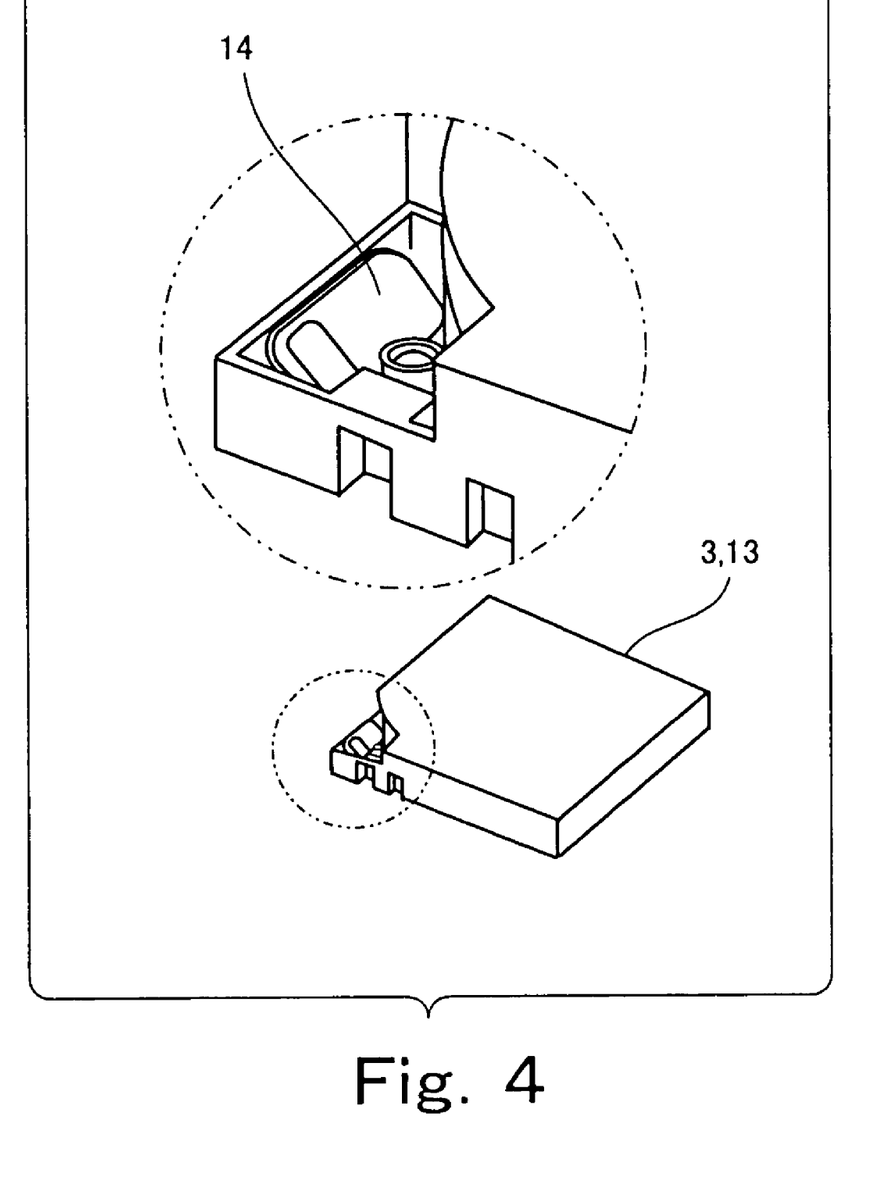
FIG. 4 is a diagram showing a cartridge memory mounted in each cartridge according to this embodiment.

FIG. 4 is a diagram showing the cartridge memory mounted in each cartridge according to this embodiment.

Each cartridge 3 contains a magnetic tape (not shown). Besides, as shown in FIG. 4, it is equipped with the cartridge memory 14 which stores information rewritably in a non-volatile manner.

Incidentally, the cartridge memory 14 in this embodiment corresponds to the second memory according to the present invention.

The cartridge memory 14 may be, for example, a contactless flash memory such as a "Linear Tape-Open Cartridge Memory (LTO-CM)" (registered trademark) equipped with a wireless interface and capable of high-speed access.

Among the multiple cartridges used for the library device 1, the diagnostic cartridge 13 has its cartridge memory 14 store backup information which is the same as the control information stored in the flash memory 12 (see FIG. 3).

Also, in the library device 1 (see FIG. 2) according to this embodiment, the flash memory 12 (see FIG. 3) stores ID information about the library device 1 as part of the control information. Upon power-up of the library device 1, the main control board 8_1 judges whether the ID information stored in the flash memory 12 represents this library device 1, and if the ID information stored in the flash memory 12 does not represent this library device 1, the robot 6 takes the diagnostic cartridge 13 out of the cell array 2, reads the backup information out of the cartridge memory 14 installed in the diagnostic cartridge 13 to send the backup information to the robot control board 8_2 which in turn sends the backup information to the main control board 8_1, and the main control board 8_1 writes the backup information received from the robot 6 into the flash memory 12.

Figure 5:
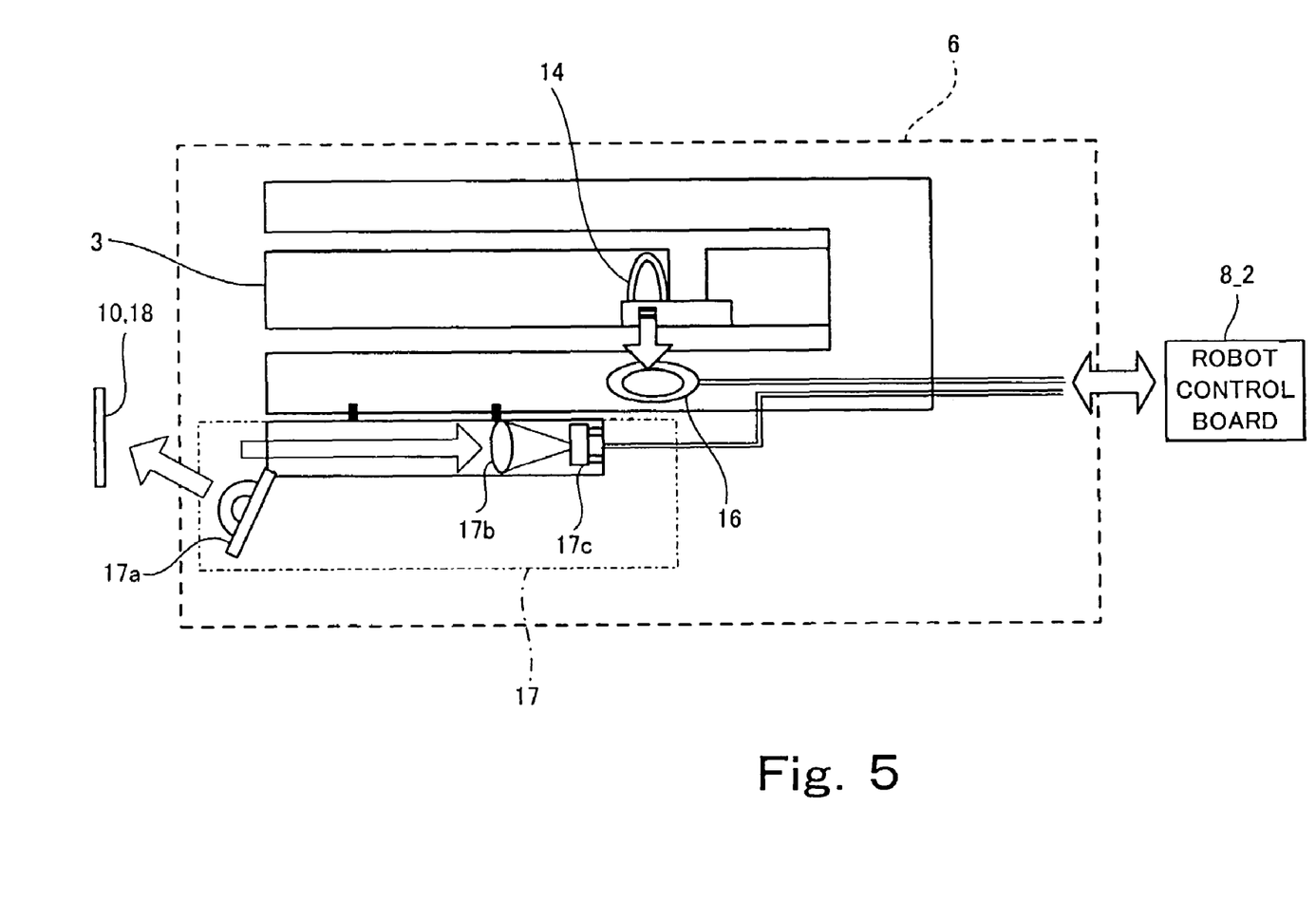
FIG. 5 is a sectional view of a robot according to this embodiment.

FIG. 5 is a sectional view of the robot according to this embodiment.

As shown in FIG. 5, the robot 6 is equipped with a memory reader/writer 16 which accesses the cartridge memory 14 installed in the cartridge 3 received by the robot 6.

Also, the robot 6 is equipped with a CCD unit 17 which can read both barcode labels 10 and cell flags 18.

Incidentally, the CCD unit 17 in this embodiment corresponds to the first sensor according to the present invention.

The CCD unit 17 consists mainly of a light-emitting device 17a which emits light to the barcode label 10 or cell flag 18, lens 17b which gathers reflected light from the barcode label 10 or the cell flag 18, and CCD 17c which receives the reflected light gathered by the lens 17b.

According to this embodiment, when the library device 1 (see FIG. 2) is powered on, the robot 6 reads the barcode label 10 using the CCD unit 17 (see FIG. 5), extracts the ID information from the barcode label 10, and sends the ID information to the main control board 8_1 (see FIG. 2) via the robot control board 8_2, and the main control board 8_1 checks the ID information received from the robot 6 against the ID information stored in the flash memory 12 (see FIG. 3), and thereby judges whether the ID information stored in the flash memory 12 represents this library device 1.

Also, as described above, in the library device 1 according to this embodiment, the cell flags 18 which are marks used to recognize the locations of cells 4 composing the cell array 2 (see FIG. 2) are provided at multiple locations and the robot 6 has a second sensor to detect the locations of the cell flags 18.

In the library device 1 according to this embodiment, the CCD unit 17 serves both as the first sensor and second sensor.

Furthermore, in the library device 1 according to this embodiment, the flash memory 12 (see FIG. 3) stores, as part of the control information, location information about the cell flags 18 (see FIG. 2) detected by the CCD unit 17 or location information, derived from the cell flag location information, about the cells corresponding to the cell flags 18. Upon power-up, if the two pieces of ID information—i.e., the ID information received from the robot 6 and the ID information stored in the flash memory 12—do not match, the robot 6 detects the locations of the cell flags 18 and sends location information about the cell flags 18 to the main control board 8_1, the main control board 8_1 finds location information about the cell 4a containing the diagnostic cartridge 13 based on the location information received from the robot 6, and the robot 6 takes the diagnostic cartridge 13 out of the appropriate cell 4a by moving according to the location information, found by the main control board 8_1, about the cell 4a.

Next, operation of the library device according to this embodiment will be described with reference to flowcharts.

Figure 6:
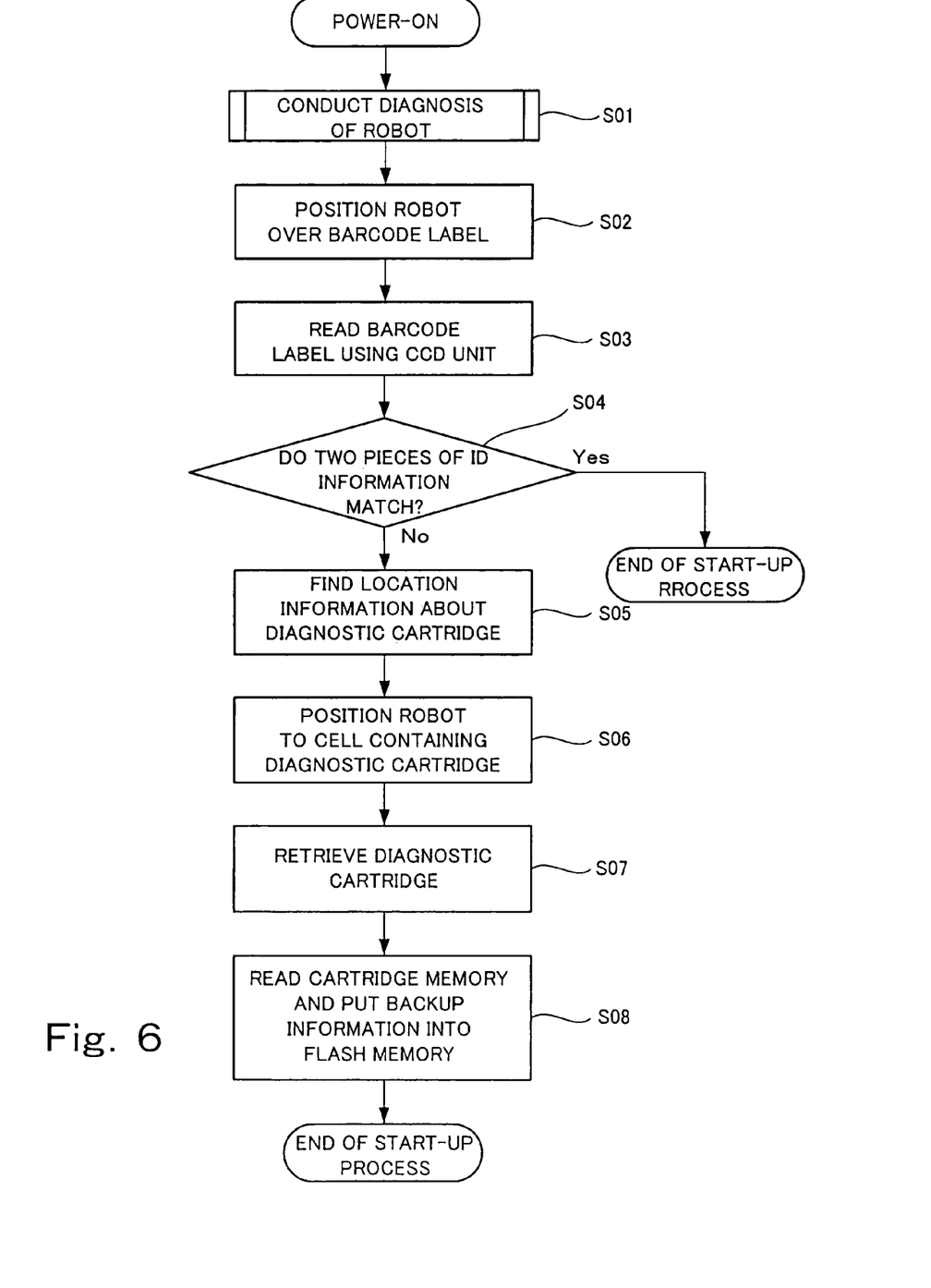
FIG. 6 is a flowchart showing the operation performed by the library device according to this embodiment to restore control information.

FIG. 6 is a flowchart showing the operation performed by the library device according to this embodiment to restore control information.

As shown in FIG. 6, when the library device 1 (see FIG. 2) is powered on, diagnosis of the operating condition of the robot 6 is started (step S01).

When the diagnosis of the robot 6 is finished, the robot 6 is positioned over the barcode label 10 (step S02), reads the barcode label 10 using the CCD unit 17 (see FIG. 5) (step S03), and sends the ID information recorded on the barcode label 10 to the main control board 8_1 (see FIG. 2).

The main control board 8_1 checks the ID information received from the CCD unit 17 against the ID information stored in the flash memory 12, and thereby judges whether the ID information stored in the flash memory 12 represents this library device 1 (step S04).

If it is found in step S04 that the ID information received from the CCD unit 17 matches the ID information stored in the flash memory 12, this indicates that the ID information stored in the flash memory 12 represents this library device 1, and thus the library device 1 is started up based on the control information stored in the flash memory 12.

On the other hand, if the ID information received from the CCD unit 17 does not match the ID information stored in the flash memory 12, it turns out that the ID information stored in the flash memory 12 does not represent this library device 1, meaning that the main control board 8_1 has been replaced, and thus the control information is restored from the backup information. That is, the robot 6 (see FIG. 5) detects the locations of the cell flags 18 by the CCD unit 17 and sends location information about the detected cell flags 18 to the main control board 8_1.

The main control board 8_1 determines the location of the cell 4a containing the diagnostic cartridge 13 (see FIG. 2) based on the location information received from the robot 6 (step S05).

The robot 6 (see FIG. 2) moves to the cell 4a (step S06) based on the location information found by the main control board 8_1, takes the diagnostic cartridge 13 out of the cell 4a (step S07), reads the backup information out of the cartridge memory 14 of the diagnostic cartridge 13, and sends the backup information to the main control board 8_1.

The main control board 8_1 (see FIG. 3) puts the received backup information into the flash memory 12 (step S08).

In this way, the control information is restored from the backup information and the library device 1 is started up based on the restored control information.

Next, description will be given of how the library device according to this embodiment backs up control information in the diagnostic cartridge.

Figure 7:
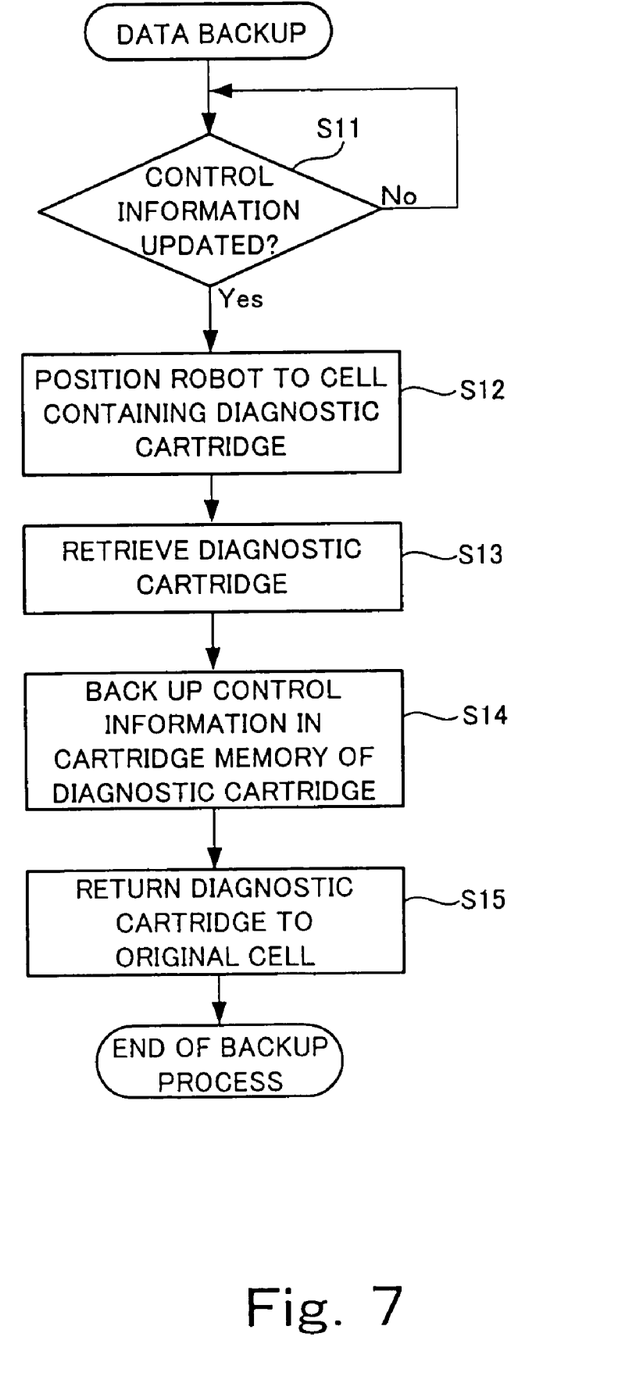
FIG. 7 is a flowchart showing the operation performed by the library device according to this embodiment to store control information.

FIG. 7 is a flowchart showing the operation performed by the library device according to this embodiment to store control information.

On the library device 1 (see FIG. 2), the operator operates the host computer 20, as required, to transfer the cartridges 3 to/from the cell array 2, and the control information in the flash memory 12 (see FIG. 3) of the main control board 8_1 is updated accordingly. The updated control information must be stored in the cartridge memory 14 of the diagnostic cartridge 13 as backup information.

In this case, the library device according to this embodiment backs up the updated control information automatically in the cartridge memory 14 of the diagnostic cartridge 13 according to the following procedures.

Specifically, when it is detected that the control information in the flash memory 12 of the main control board 8_1 (see FIG. 3) has been updated (step S11 in FIG. 7), the robot 6 (see FIG. 5) moves to the cell 4a based on the control information in the flash memory 12 (see FIG. 3) of the main control board 8_1 (step S12), takes the diagnostic cartridge 13 out of the cell 4a (step S13), and backs up the control information in the cartridge memory 14 of the diagnostic cartridge 13 from the flash memory 12 of the main control board 8_1 (step S14).

Then, the robot 6 returns the diagnostic cartridge 13 to the original cell 4a (step S15).

Consequently, the control information about the library device is stored in the cartridge memory 14 of the diagnostic cartridge 13 as backup information.

Figure 8:
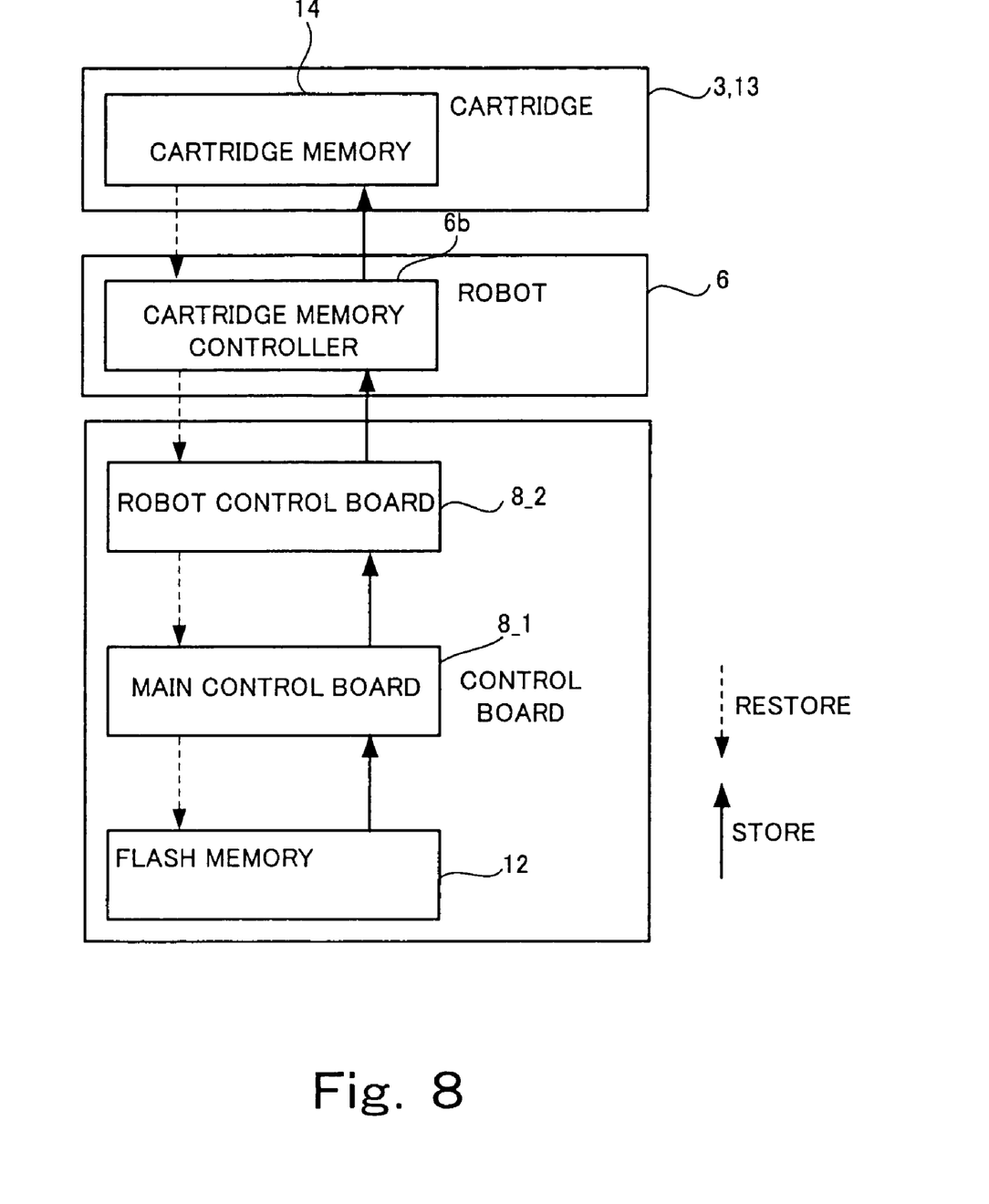
FIG. 8 is a diagram showing flows of information which take place when control information is stored and restored in the library device according to this embodiment.

FIG. 8 is a diagram showing flows of information which take place when control information is stored and restored in the library device according to this embodiment.

As shown in FIG. 8, when restoring control information, the backup information is sent from the cartridge memory 14 (see FIG. 4) installed in the diagnostic cartridge 13, through the CCD unit 17 (see FIG. 5) of the robot 6, the robot control board 8_2, the main control board 8_1, to the flash memory 12 (see FIG. 3).

On the other hand, when storing control information, the control information is sent from the flash memory 12 (see FIG. 3) in the main control board 8_1, through the main control board 8_1, the robot control board 8_2, and the cartridge memory controller 6b (see FIG. 3), to the cartridge memory 14 (see FIG. 4) installed in the diagnostic cartridge 13.

What is claimed is:

1. A library device comprising:
   a cell array which consists of an array of multiple cells each of which contains one of multiple cartridges each containing a storage medium;
   media drives in which the cartridges are removably mounted and which access the storage medium contained in the cartridges;
   a robot which transfers the cartridges between the cell array and the media drives; and
   a control board which controls operation of the library device, being equipped with a first memory which stores control information needed to control the operation of the library device, rewritably in a non-volatile manner,
   wherein each of the cartridges contains the storage medium and comprises a second memory which stores information rewritably in a non-volatile manner,
   wherein the robot is equipped with a memory reader/writer which accesses the second memory installed in the cartridge received by the robot, wherein one of the multiple cartridges is a diagnostic cartridge for the library device and the second memory installed in the diagnostic cartridge stores backup information which is the same as the control information stored in the first memory, and wherein when the control board is replaced with a new control board, the backup control information is automatically transferred to the first memory of the new control board from the second memory of the diagnostic cartridge.

2. The library device according to claim 1, wherein:

the first memory stores, as part of the control information, ID information which represents the library device; and upon power-up, the control board judges whether the ID information stored in the first memory represents the library device, and if the ID information stored in the first memory does not represent the library device, the robot takes the diagnostic cartridge out of the cell array, reads the backup information out of the second memory installed in the diagnostic cartridge, and sends the backup information to the control board, and the control board writes the backup information received from the robot into the first memory.

3. The library device according to claim 2, wherein:

the library device comprises a serial label which contains ID information representing the library device and the robot comprises a first sensor which reads the serial label; and upon power-up, the robot reads the serial label using the first sensor, extracts the ID information from the serial label, and sends the ID information to the control board, and the control board checks the ID information received from the robot against the ID information stored in the first memory, and thereby judges whether the ID information stored in the first memory represents this library device.

4. The library device according to claim 3, wherein:

the cell array has, over a plurality of locations, cell flags which are marks used to recognize locations of the plurality of cells composing the cell array, the robot comprises a second sensor to detect the locations of the cell flags, and the first memory stores, as part of the control information, location information about the cell flags detected by the second sensor or location information about the cells corresponding to the cell flags detected by the second sensor; and upon power-up, if the two pieces of ID information do not match, the robot detects the locations of the cell flags using the second sensor and sends the location information about the cell flags to the control board, the control board finds location information about the cell containing the diagnostic cartridge based on the location information received from the robot, and the robot takes the diagnostic cartridge out of the cell containing the diagnostic cartridge by moving according to the location information, found by the control board, about the cell containing the diagnostic cartridge.

5. The library device according to claim 1, wherein the cartridges contain magnetic tape as the storage medium and the media drives access the magnetic tape contained in the cartridges.

6. The library device according to claim 1, wherein the second memory installed in the cartridge and the memory reader/writer installed on the robot communicate with each other wirelessly.

7. The library device according to claim 3, wherein the serial label is a barcode label which uses a barcode as the ID information about the library device and that the first sensor reads the barcode recorded on the barcode label using a one-dimensional array of light-sensitive devices.

8. The library device according to claim 4, wherein the first sensor combines the second sensor.

9. A library device, comprising:

a cell array which consists of an array of multiple cells each of which contains one of multiple cartridges each containing a storage medium;

media drives in which the cartridges are removably mounted and which access the storage medium contained in the cartridges;

a robot which transfers the cartridges between the cell array and the media drives; and a control board which controls operation of the library device, being equipped with a first memory which stores control information needed to control the operation of the library device, wherein each of the cartridges comprises a second memory which stores information, wherein the robot is equipped with a memory reader/writer which accesses the second memory installed in the cartridge received by the robot, wherein one of the multiple cartridges is a diagnostic cartridge for the library device and the second memory installed in the diagnostic cartridge stores backup information which is the same as the control information stored in the first memory, and wherein when the control board is replaced with a new control board, the backup control information is automatically transferred to the first memory of the new control board from the second memory of the diagnostic cartridge.

* * * * *